Aug. 21, 1923.

1,465,337

O. BINFORD

DIE NUT

Filed July 6, 1918

Witnesses
T. H. Parnell

Inventor
O. Binford
By Victor J. Evans
Attorney

Patented Aug. 21, 1923.

1,465,337

UNITED STATES PATENT OFFICE.

ORLANDO BINFORD, OF CITRONELLE, ALABAMA.

DIE NUT.

Application filed July 6, 1918. Serial No. 243,586.

*To all whom it may concern:*

Be it known that I, ORLANDO BINFORD, a citizen of the United States, residing at Citronelle, in the county of Mobile and State of Alabama, have invented new and useful Improvements in Die Nuts, of which the following is a specification.

This invention relates to new and useful improvements in rethreading devices and the principal object of the invention is to provide a die for rethreading and removing rust and dirt from the ends of a bolt so as to facilitate the removal of the nut therefrom.

Another object of the invention is to so form the face of the die that the same may be threaded on the bolt into close contact with the nut so as to clean the threads close up to the nut.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
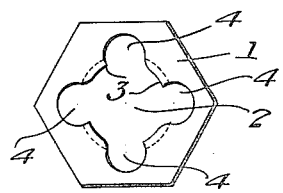
Figure 2:
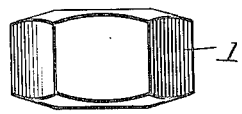
Figure 3:
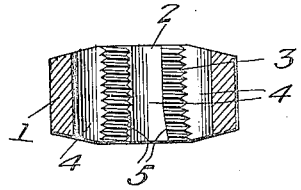

Figure 1 is a front view of the die.
Figure 2 is a side view thereof.
Figure 3 is a cross section.

As shown in these views the die comprises a body part 1 which may be of any suitable shape. The die is provided with the usual central opening 2 having the cutting edges 3 and the clearance spaces 4 between the cutting edges. The front and rear faces of the die are beveled from the opening to the outer edges thereof as shown in Figures 2 and 3. This will permit the die to be threaded on the bolt close against the nut even though said bolt is bent. The front part of the central opening is of conical shape as shown at 5 so as to facilitate the placing of the die on the end of the bolt and to permit said die to be placed on the end of a bolt, the end of which has been upset.

The die is more particularly adapted for cleaning rust and dirt from the screw threads of a bolt so that the nut on said bolt may be easily removed. The die is to be used on one size of bolt so that for different sizes of bolts different dies must be used. The die is to be made of substantially the same shape as the nut so that the wrench used for tightening the nut may also be used for actuating the die. In this way the die may be used on bolts which are located in positions difficult of access with the usual form of dies.

My invention is also useful for rethreading new bolts which have been forced through bolt holes which have lost their shape by the parts being subjected to strain. By my invention the bolt may be forced through such holes and then rethreaded to receive the nut.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A rethreader die of the class described comprising a body having a central opening therein and cutting edges provided therefor, the front and rear faces of said die being beveled from the opening to the outer edges thereof, to permit said die to be threaded on a bolt, the front portion of the central opening being of conical shape to facilitate the placing of the die on the end of a bolt, the die being of substantially the same shape as the nut to permit access thereto, said die being used on bolts which are located in positions difficult of access with the usual form of dies.

In testimony whereof I affix my signature.

ORLANDO BINFORD.